Figure 1:
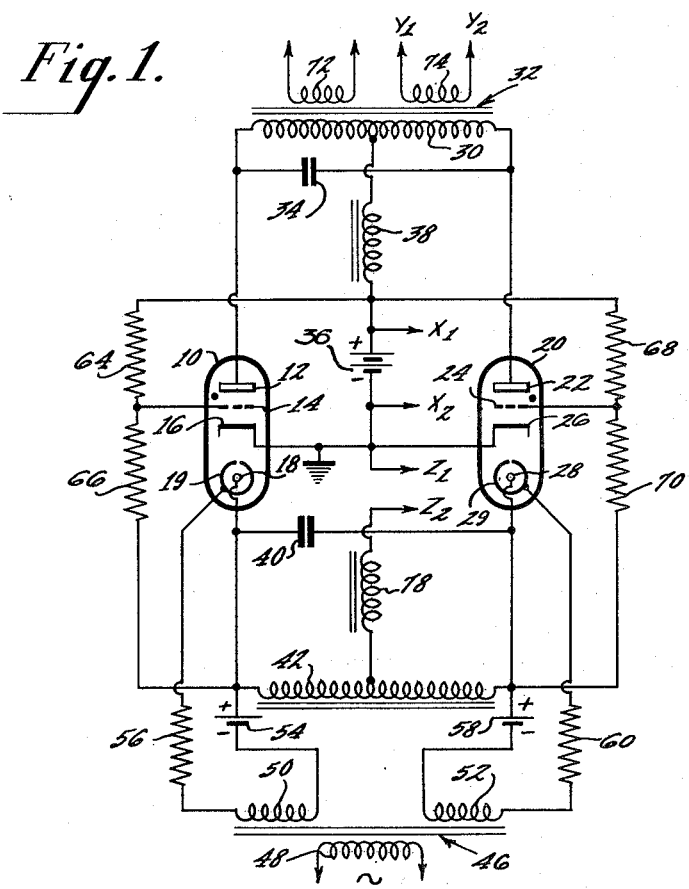

Oct. 12, 1954  J. B. ZIRKER  2,691,755

SELF-EXCITED INVERTER SYSTEM

Filed Nov. 29, 1952

INVENTOR.
Jack B. Zirker

BY

ATTORNEY

Patented Oct. 12, 1954

2,691,755

UNITED STATES PATENT OFFICE 2,691,755

SELF-EXCITED INVERTER SYSTEM

Jack B. Zirker, Princeton, N. J., assignor to Radio Corporation of America, a corporation of Delaware Application November 29, 1952, Serial No. 323,183

10 Claims. (Cl. 321—36)

This invention relates to self-excited inverter systems of the type used to convert D.-C. electrical energy into A.-C. electrical energy. More particularly, the invention relates to a means for deriving a self-excited auxiliary source of unidirectional voltage from an inverter system normally requiring two sources of unidirectional voltage, and means for applying the auxiliary voltage source to the inverter system to start it, and then to keep it in normal operation. While not specifically limited thereto, the inverter circuit of the present invention is particularly applicable to convert the low D.-C. voltage supplies efficiently in automobiles, airplanes, tanks and the like, into relatively high A.-C. voltages.

In a copending patent application, Serial No. 317,964, filed October 31, 1952, by E. O. Johnson and W. M. Webster, Jr., and assigned to the assignee of the present invention, there is described an inverter system similar to the self-excited system of the present invention, except that the former inverter system is not self-excited. The inverter system of Johnson and Webster, Jr. requires two sources of unidirectional voltage for proper operation; namely, a first or main source, and a second or auxiliary source. The main source of unidirectional voltage, which is the source that is converted into A.-C. electrical energy, is readily available in automobiles, planes, tanks and the like, since this source usually constitutes the battery with which these vehicles are normally equipped. Depending upon the gas in the gas tubes used in the inverter system, however, the auxiliary voltage source requirements may range from 24 volts to about 100 volts. Since most vehicles do not normally have unidirectional voltage sources greater than 24 volts, they must carry an auxiliary power supply in addition to their usual battery for operating an inverter system of the type described. In accordance with the present invention, the inconvenience and expense of supplying an auxiliary power supply for operation of this type of inverter system is obviated.

It is, therefore, an important object of the present invention to provide a novel, self-excited, inverter system of the type described which will overcome the above-mentioned disadvantages.

It is a further object of the present invention to provide in combination with an inverter system of the type described, means to supply an auxiliary source of unidirectional voltage for the purpose of starting the inverter system and for maintaining it in normal operation.

Still a further object of the present invention is to provide, in combination with an inverter system of the type described, means for deriving an auxiliary power supply from a main power supply for the purpose of starting the inverter system, and means for maintaining the auxiliary power supply after the inverter system has begun operation.

Another object of the present invention is to provide, in combination with an inverter system of the type described, a plurality of capacitors and switching means to utilize the capacitors first as a source of voltage to start the inverter system, and then as a filter for a rectified voltage to maintain the inverter system in operation.

Still another object of the present invention is to provide a novel, self-excited inverter system of the type described which is simple in construction, positive in operation, and highly efficient in use.

The self-excited rectifier system, in accordance with the present invention, employs gas tubes of the type described in a copending application, Serial No. 185,745, filed September 20, 1950, by E. O. Johnson, and assigned to the assignee of the present invention. This gas tube is of the type wherein the function of supplying energy to provide a space charge neutralizing plasma and the function of providing a field to draw work current are separated. This tube has at least an anode, a main cathode, an auxiliary cathode, and a constricting electrode surrounding the auxiliary cathode and formed with an opening opposite the main cathode. In the usual operation of this type of gas tube, a first source of voltage is required in the anode-main cathode circuit for the workload, and a second source of voltage is required in the main cathode-auxiliary cathode circuit for the purpose of producing an ionization discharge.

These and other objects of the present invention are attained in a novel, self-excited, inverter system employing gaseous discharge tubes of the type described wherein the working function and the ionization function are separated. A pair of gas tubes each having at least an anode, a main cathode, an auxiliary cathode, and a garrote or constricting electrode are connected in a parallel-type inverter circuit. The first or main source of unidirectional voltage to be converted into a source of A.-C. voltage is connected in the anode-main cathode circuit of each tube. The anodes of each tube are coupled to an output transformer. A driving signal is applied alternately between the auxiliary cathode and constricting electrode of each of the tubes in order to file the gas tubes in a cyclical order. In order to supply the second or auxiliary source of unidirectional voltage across the main and auxiliary cathodes, there is provided one or more capacitors and switching means to connect selectively the capacitors first in parallel with each other and with the first voltage source, and then in series with each other and with the main and auxiliary cathodes in order to start the inverter system. Means comprising a rectifier, and including the switching means and the capacitors, are also provided to rectify a portion of the alternating voltage output of the inverter system and to feed back a unidirectional voltage of the required magnitude for the main cathode-auxiliary cathode circuit in order to keep the inverter system in normal operation once it has started. In this latter arrangement, the capacitors act as a rectifier filter circuit.

Figure 2:
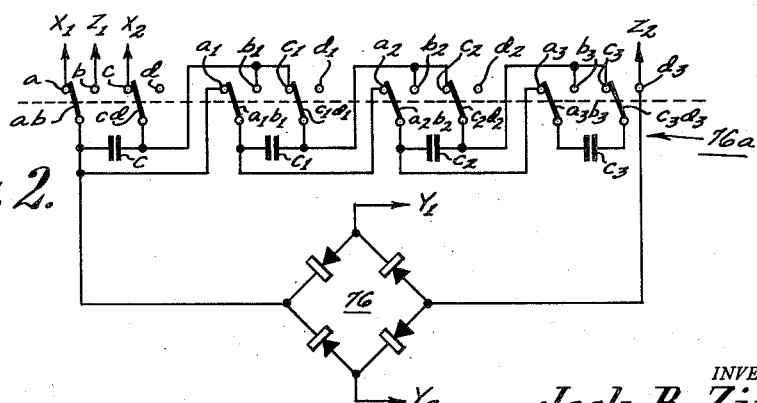

The novel features of the invention, as well as the invention itself, both as to its organization and method of operation will be understood in detail by the following description when considered in connection with the accompanying drawing in which:

Fig. 1 is a circuit diagram of a portion of the inverter system, in accordance with the present invention, and Fig. 2 is a circuit diagram of a starting circuit and an auxiliary voltage source, in accordance with the present invention, for use with the circuit shown in Fig. 1.

Referring now to Fig. 1, there is shown a parallel-type inverter circuit employing a pair of gas tubes 10 and 20 of the type described. Each of the tubes 10 and 20 has, respectively, an anode 12 and 22, a grid 14 and 24, a main cathode 16 and 26, an auxiliary cathode 18 and 28, and a constricting electrode 19 and 29. The constricting electrodes 19 and 29 surround their respective auxiliary cathodes 18 and 28, and each are formed with an opening or slot opposite their respective main cathodes 16 and 26. The anodes 12 and 22 of the tubes 10 and 20 are connected to each other through the primary 30 of an output transformer 32. The anodes 12 and 22 are also connected to each other through a commutating capacitor 34. The main cathodes 16 and 26 of tubes 10 and 20 are connected to each other and to a source of reference potential such as ground. A first or main source of unidirectional voltage 36, which is to be converted into an A.-C. voltage, has its negative terminal connected to the main cathodes 16 and 26 of the tubes 10 and 20, and its positive terminal connected to a center tap on the primary winding 30 of the transformer 32 through a smoothing choke 38. The auxiliary cathodes 18 and 28 of the tubes 10 and 20 are connected to each other through a commutating capacitor 40 in parallel with a center tapped impedance or choke 42. It is possible to omit the smoothing choke 38 without seriously affecting the operation of the circuit. Also, the choke 42 may be replaced with a center tapped resistor.

Means are provided to fire the tubes 10 and 20 alternately. To this end, there is provided an input transformer 46 having a primary winding 48 adapted to be connected across any convenient and conventional source of alternating voltage (not shown). The input transformer 46 is provided with two secondary windings 50 and 52. The secondary winding 50 is connected in the auxiliary cathode-constricting electrode circuit of the tube 10 in series with the auxiliary cathode 18, a bias voltage source 54, a current limiting resistor 56, and the constricting elec-trode 19. In a similar manner, the secondary winding 52 of the input transformer 46 is connected in the auxiliary cathode-constricting electrode circuit of the tube 20, in series with the auxiliary cathode 28, a bias voltage source 58, a current limiting resistor 60, and the constricting electrode 29. The bias supplied by the bias batteries 54 and 58 may also be obtained by the usual cathode bias arrangement that is normally used with electron discharge tubes.

Although the tubes 10 and 20 in the inverter system, in accordance with the present invention, will operate without their respective grids 14 and 24, these grids and bias means therefor may be provided in the manner described in the above-mentioned copending application, Serial No. 317,964. To this end, each of the tubes 10 and 20 is provided with a separate voltage divider. A resistor 64 has one end connected to the positive terminal of the voltage source 36, and the other end connected to the auxiliary cathode 18 of the tube 10 through a resistor 66. The grid 14 of the tube 10 is connected to the junction between the resistors 64 and 66. A similar voltage divider is provided for the tube 20. A resistor 68 has one end connected to the positive terminal of the voltage source 36, and the other end connected to the auxiliary cathode 28 of the tube 20 through a resistor 70. The output of the inverter system for the workload (not shown) is obtained across the secondary winding 72 of the output transformer 32. A second secondary winding 74 of the output transformer utilizes a portion of the voltage output of the inverter system in a manner hereinafter appearing.

In order to provide an ionizing potential for the main cathode-auxiliary cathode circuit for each of the tube 10 and 20, in accordance with the present invention, an auxiliary power supply, a second source of unidirectional voltage, is necessary. Means for providing this auxiliary power supply, in connection with the inverter circuit of Fig. 1, is shown in Fig. 2.

Referring now to Fig. 2, there is shown a relay 76a having a plurality of sets of contacts a, b, c and d; a1, b1, c1 and d1; a2, b2, c2 and d2; and a3, b3, c3 and d3. A plurality of synchronously operated switches ab, cd, a1b1, c1d1, a2b2, c2d2, a3b3, and c3b3, of the relay 76a, are provided to make contact selectively between the contacts a and b, c and d, a1 and b1, c1 and d1, a2 and b2, c2 and d2, a3 and b3, and c3 and d3, respectively. A capacitor C or electron storage means, has one side connected to the switch ab and to the contact a1, and the other side connected to the switch cd and to the contacts b1 and c1. A capacitor C1 has one side connected to the switch a1b1 and to the contact a2, and the other side connected to the switch c1d1 and to the contacts b2 and c2. A capacitor C2 has one side connected to the switch a2b2 and to the contact a3, and the other side connected to the switch c2d2 and to the contacts b3 and c3. A capacitor C3 has one side connected to the switch a3b3, and the other side connected to the switch c3d3. A full wave rectifier network 76 comprising half-wave rectifiers of any conventional and suitable type has its output connected between the switch ab and the contact d3.

The secondary winding 74 of the output transformer 32 has its terminals Y1 and Y2 connected across the input terminals Y1 and Y2 of the full wave rectifier network 76. The contacts a and c of the relay 76a are connected to the positive and negative terminals of the voltage source 36, respectively. The contact $b$ is connected to the negative terminal of the voltage source 36 and the contact $d3$ is connected to the center tap of the choke 42 through a smoothing choke 78. The smoothing choke 78 may be omitted without seriously affecting the operation of the inverter system.

The operation of the self-excited inverter system, in accordance with the present invention, is as follows: In order to start the inverter system, the synchronously operated, relay switches $ab$, $cd$, $a1b1$, $c1d1$, $a2b2$, $c2d2$, $a3b3$ and $c3d3$ are in the positions shown in Fig. 2, that is, they are making contact with the contacts $a$, $c$, $a1$, $c1$, $a2$, $c2$, $a3$, and $c3$, respectively. In this position of the relay switches, the capacitors C, C1, C2 and C3 are connected in parallel across the voltage source 36 and are being charged thereby. When these capacitors are charged, the switches $ab$, $cd$, $a1b1$, $c1d1$, $a2b2$, $c2d2$, $a3b3$, and $c3d3$ are switched in order to make contact with the contacts $b$, $d$, $b1$, $d1$, $b2$, $d2$, $b3$ and $d3$, respectively. In this position of the switches, the capacitors C, C1, C2 and C3 are connected in series with each other and across the terminals Z1, Z2 in the main cathode-auxiliary circuit of each of the tubes 10 and 20. This voltage on the capacitors in series is now of such a magnitude as to produce an ionization discharge in these tubes when aided by the triggering pulses supplied by the input transformer 46, for starting the inverter system. A triggering pulse from the secondary winding 50 of the transformer 46, for example, will now cause an ionization discharge across the main and auxiliary cathodes 16 and 18, respectively, of the tube 10. As a result of this ionization discharge current begins to flow in the anode-main cathode circuit of the tube 10. This current now flowing in the primary winding 30 of the transformer 32 causes a voltage to be induced across the secondary winding 74. Once operation has begun, the alternating voltage output across the secondary winding 74 of the output transformer 32 is rectified by the rectifier network 76, and the resulting rectified voltage is applied in the main cathode-auxiliary cathode circuit of the tubes 10 and 20, whereby the inverter system will continue to operate. For example, the feed back rectified voltage is of a sufficient magnitude to cause an ionization discharge in the main cathode-auxiliary cathode circuit of the tube 20. Consequently, current begins to flow in the anode-main cathode circuit of the tube 20 and induces a voltage in the secondary winding 74 of the transformer 32. This current is again rectified by the rectifier network 76, as before. Thus, once operation has begun a portion of the A.-C. output of the inverter system is rectified and fed back to function as an auxiliary power supply. From this point on the inverter system may be considered as having two sources of unidirectional voltage whereby the tubes 10 and 20 may be triggered alternately. It is noted that the capacitors C, C1, C2 and C3 are now connected in series with each other and across the output of the rectifier network 76 and serve to provide a filtering circuit for the rectifier network 76.

The relay 76a may be a part of the relay usually provided for the quick heating of the filaments of the gas tubes used in inverter systems of the type described.

The number of capacitors used in connection with the switching means shown and described in Fig. 2 will depend upon the magnitude of the voltage required in the main cathode-auxiliary cathode circuit of the gas tube used. Where xenon, for example, is the gas used in the tubes 10 and 20, only one capacitor will be necessary where the voltage source 36 is in the neighborhood of 24 volts. Where the voltage source 36, however, is about 6 volts, the four capacitors C, C1, C2 and C3 will be necessary. The number of capacitors used in connection with the switching circuit comprising the relay 76a will be determined by the voltage of the main voltage source 36 and the magnitude of the voltage required in the main cathode-auxiliary cathode circuit. The generalization to any number of capacitors used should now be obvious. Since these capacitors are first charged in parallel and then connected in series, when $n$ capacitors are used each capacitor should have $n$ times the total capacitance required. Thus, in the case of 4 capacitors, as shown and described, each capacitor should have a value of $4f$ if $f$ is the total capacitance required.

Thus, there has been shown and described above, in accordance with the objects of the present invention, a novel self-excited inverter system wherein an auxiliary power supply, one of the two required voltage supplies, is derived by self-excited means. A plurality of capacitors are provided in connection with switching means whereby the capacitors are first connected in parallel across the main power supply, and then switched in series with each other in the main cathode-auxiliary cathode circuit to start the inverter system. Once the inverter system has begun to operate, a portion of the alternating voltage from the output circuit is rectified and fed back, by means of the switching means, into the main cathode-auxiliary circuit. The capacitors subsequently function as a filter across the rectifier network.

What is claimed is:

1. In an inverter sytem of the type comprising a gas tube having an anode, a main cathode, an auxiliary cathode, and a constricting electrode, means to apply a first source of unidirectional voltage between said anode and said main cathode, means connected between said auxiliary cathode and said constricting electrode to fire said tube periodically, and output means connected between said anode and said voltage means; the combination therewith of electron storage means, switching means to connect selectively said storage means across said first voltage source, and in series with said main cathode and said auxiliary cathode to start said inverter system, and means including said switching means and electron storage means connected to said output means and in circiut with said main cathode and said auxiliary cathode to provide a second source of unidirectional voltage, whereby said inverter is self-excited.

2. In an inverter system of the type comprising a gas tube having an anode, a main cathode, an auxiliary cathode, and a constricting electrode, means to apply a first source of unidirectional voltage between said anode and said main cathode, means connected between said auxiliary cathode and said constricting electrode to fire said tube periodically, and output means connected between said anode and said voltage means; a plurality of capacitors (1) in parallel with each other and across said first voltage source, and (2) in series with each other and with said main cathode and said auxiliary cathode to start said inverter system, rectifier means connected to a portion of said output means, and means including said switching means to connect said rectifier means in series with said main and auxiliary cathodes, whereby said inverter system is self-excited.

3. An inverter system as defined in claim 2 characterized by the addition of means to apply said capacitors across said rectifier means when said rectifier means is connected in series with said main and auxiliary cathodes.

4. In an inverter system of the type comprising a pair of gas tubes each having an anode, a main cathode, an auxiliary cathode, and a constricting electrode, output means coupled to said anodes, means to apply a first source of unidirectional voltage between the anode and the main cathode of each of said tubes, and means connected between the auxiliary cathode and the constricting electrode of each of said tubes to fire said tubes alternately, the combination therewith of electron storage means, switching means to connect selectively said electron storage means across said first source, and in circuit with the main cathode and auxiliary cathode of each of said tubes, rectifier means connected to a portion of said output means to provide a second source of unidirectional voltage, and means including said switching means to apply said second source in circuit with the main cathode and auxiliary cathode of each of said tubes.

5. An inverter system as defined in claim 4 wherein said storage means is connected across said rectifier means.

6. In an inverter system of the type comprising a pair of gas tubes each having an anode, a main cathode, an auxiliary cathode, and a constricting electrode, output means coupled to said anodes, means to apply a first source of unidirectional voltage between the anode and the main cathode of each of said tubes, and means connected between the auxiliary cathode and the constricting electrode of each of said tubes to fire said tubes alternately, the combination therewith of a plurality of capacitors, switching means to connect selectively each of said capacitors first in parallel with each other and across said first source, and then in series with each other and with the main cathode and the auxiliary cathode of each of said tubes to start said inverter system, and means including said capacitors and switching means, connected to said output means and in circuit with the main cathode and the auxiliary cathode of each of said tubes to provide a second source of unidirectional voltage, whereby said inverter system is self-excited.

7. A self-excited inverter system comprising a pair of gas tubes each having an anode, a main cathode, an auxiliary cathode, and a constricting electrode, means to apply a first source of unidirectional voltage in circuit with the anode and the main cathode of each of said tubes, output means coupled to said anodes, means in circuit with the auxiliary cathode and the constricting electrode of each of said tubes to fire said tubes alternately, a capacitor, switching means to connect selectively said capacitor across said first source, and in series with the main and auxiliary cathodes of each of said tubes.

8. A self-excited inverter system as defined in claim 7 characterized by the addition of a rectifier network having an input and an output, the input of said rectifier network being connected across a portion of said output means, said switching means comprising means to connect the output of said rectifier network in series with the main and auxiliary cathodes of each of said tubes and in parallel with said capacitor.

9. A self-excited inverter system comprising a pair of gas tubes each having an anode, a main cathode, an auxiliary cathode, and a constricting electrode, means to apply a first source of unidirectional voltage in circuit with the anode and the main cathode of each of said tubes, output means coupled to said anodes, means in circuit with the auxiliary cathode and the constriting eclectrode of each of said tubes to fire said tubes alternately, a plurality of capacitors, means to connect selectively said capacitors in parallel with each other and across said first source, and in series with each other and with the main and auxiliary cathodes of each of said tubes, rectifier means connected to a portion of the output means to rectify a portion of the alternating voltage output of the inverter system, and means including said switching means to connect said rectifier means across said capacitors when said capacitors are connected in series.

10. In a self-excited inverter system of the type used to convert a first source of unidirectional voltage into an alternating voltage output, and employing a pair of alternately fired gas tubes of the type having an anode, a main cathode, an auxiliary cathode, and a constricting electrode; means to apply a second source of unidirectional voltage in circuit with the main and auxiliary cathodes of each of said tubes comprising $n$ capacitors, a relay comprising $2n$ synchronously operated two-position switches and $4n$ contacts, each of said switches being adapted to contact selectively a different one of two contacts in each of its positions respectively, means including said switches and contacts to connect selectively said capacitors (1) in parallel with each other and across said first source; and (2) in series with each other and with the main and auxiliary cathodes of each of said tubes; a rectifier network having an input and an output, means to connect the input of said rectifier network across a portion of said alternating voltage output, and means including said switches to connect the output of said rectifier network in series with the main and auxiliary cathodes of each of said tubes.

No references cited.